United States Patent
Kim

(10) Patent No.: US 11,941,264 B2
(45) Date of Patent: Mar. 26, 2024

(54) DATA STORAGE APPARATUS WITH VARIABLE COMPUTER FILE SYSTEM

(71) Applicant: Deok Woo Kim, Seoul (KR)

(72) Inventor: Deok Woo Kim, Seoul (KR)

(*) Notice: Subject to any disclaimer, the term of this patent is extended or adjusted under 35 U.S.C. 154(b) by 29 days.

(21) Appl. No.: 17/634,613

(22) PCT Filed: Apr. 27, 2020

(86) PCT No.: PCT/KR2020/005516
§ 371 (c)(1),
(2) Date: Feb. 11, 2022

(87) PCT Pub. No.: WO2021/033868
PCT Pub. Date: Feb. 25, 2021

(65) Prior Publication Data
US 2022/0326863 A1    Oct. 13, 2022

(30) Foreign Application Priority Data
Aug. 22, 2019 (KR) .......................... 10-2019-0102973

(51) Int. Cl.
*G06F 3/06* (2006.01)

(52) U.S. Cl.
CPC .......... *G06F 3/0629* (2013.01); *G06F 3/0605* (2013.01); *G06F 3/0673* (2013.01)

(58) Field of Classification Search
None
See application file for complete search history.

(56) References Cited

U.S. PATENT DOCUMENTS

| | | |
|---|---|---|
| 2004/0103288 A1 | 5/2004 | Ziv et al. |
| 2007/0253553 A1 | 11/2007 | Abdul Rahman |
| 2008/0104348 A1 | 5/2008 | Kabzinski et al. |
| 2010/0169394 A1 | 7/2010 | Hahn |
| 2017/0293568 A1* | 10/2017 | Gunnam ............. G06F 12/0246 |
| 2018/0113875 A1* | 4/2018 | Jain ..................... G06F 16/1847 |

FOREIGN PATENT DOCUMENTS

| | | |
|---|---|---|
| KR | 10-2002-0004367 A | 1/2002 |
| KR | 10-2010-0106609 A | 10/2010 |
| KR | 10-1442539 B1 | 9/2014 |
| KR | 10-1613576 B1 | 4/2016 |

* cited by examiner

*Primary Examiner* — Edward J Dudek, Jr.
*Assistant Examiner* — Ralph A Verderamo, III
(74) *Attorney, Agent, or Firm* — Sughrue Mion, PLLC

(57) ABSTRACT

A data storage apparatus with a variable computer file system is disclosed. The variable computer file system adopts the concept of a dedicated sub-file system and is activated or deactivated according to whether authentication is granted. Each dedicated sub-file system is activated or deactivated according to whether authentication is granted, and is recognized by a host computer. Deactivated dedicated sub-file systems cannot be recognized or accessed by the host computer. Accordingly, since a third party accessing the host computer cannot access a dedicated sub-file system without possessing a means for activating the dedicated sub-file system, security is greatly strengthened.

13 Claims, 3 Drawing Sheets

| USER | SUB_FILE_SYSTEM | CERTIFICATION |
|---|---|---|
| U_AA | SFS D:/AA | PASSWORD_AA |
|  | SFS FILE *.ppt | MOBILE_AA |
|  | SFS '*my*.*' | MOBILE_AA or MOBILE_CC |
| U_BB | SFS D:/BB | USBKEY_BB |
|  | SFS 01/MAR/2019-03/MAR/2019 | MOBILE_BB |
|  | SFS C:/PROGRAM FILES/TREE | MOBILE_BB |

. . .

DATA STORAGE APPARATUS WITH VARIABLE COMPUTER FILE SYSTEM

CROSS REFERENCE TO RELATED APPLICATIONS

This application is a National Stage of International Application No. PCT/KR2020/005516 filed Apr. 27, 2020, claiming priority based on Korean Patent Application No. 10-2019-0102973 filed Aug. 22, 2019.

TECHNICAL FIELD

The present invention relates to a data storage apparatus and a computer file system.

BACKGROUND ART

In view of computer architecture, a file system is generally recognized as a part of an operating system (OS) and affects all components of the computer such as application programs and the like. Further, the file system is a basic framework for the computer to store and manage data and files containing data of users or companies, and thus the management of the file system is very important in the computer for security.

In a conventional computer, an OS and a file system are recorded in a data storage device (or an auxiliary storage device) composed of a solid-state drive (SSD), a non-volatile memory such as a non-volatile memory express (NVMe), or a mechanical storage device such as a hard disk drive (HDD), and when in booting, a bootstrap loader (e.g., a basic input/output system (BIOS) in a personal computer (PC)) reads the OS code and data from the data storage device and executes the OS code in the computer to complete the preparation for use. Meanwhile, in a distributed computer architecture using a remote file system, such as a network computer, a computer and a network-attached storage (NAS), or a cloud composed of service terminals and a server, the file system is provided to a computer remotely through a communication network.

However, considering usage examples of such a file system, it can be seen that the file system structure is simply composed of a computer and a data storage device in which an OS code and file system are stored, and therefore, the file system of the computer is generally operated depending on the OS, and one file system corresponding to the OS is operated in one OS.

Depending on the application examples, it is also possible that one computer can be configured to use several types of OS. For example, in the case of a PC, the user specifies a boot partition in a BIOS by configuring one partition as a file system of Windows OS and another partition as a file system of Linux OS so that Windows and Linux can be used together, and thus the PC may be booted with the required OS. However, when the booting is completed, one file system controlled by one OS becomes a file system of the corresponding computer.

In the meantime, when the PC is ready to use after the OS ends the booting, a user authentication is usually performed. Basically, a widely used user authentication method utilize an identification (ID) and a password, which has recently developed into hardware fingerprint recognition or ID card certification.

After the booting is completed, the OS and security software are responsible for the security of the file system. Most OS's provide a certain degree of security by adopting a method in which access rights to system resources including the file system are different for each user. In addition, a simple security method of avoiding screen exposure by temporarily locking a screen is also provided. In companies and public institutions, security software that monitors files that are duplicated, transmitted, or printed is also used.

However, if an unauthorized user or program accesses the computer and becomes an administrator of the OS due to infection of a malicious program, leakage of ID or password, loss of ID card, etc., those various security methods are meaningless. For example, a function of maintaining security by locking a screen or automatically logging out when a user's keyboard or mouse does not operate for a certain period of time cannot actually act as a security function in the case of infection with a malicious program or leakage of ID or password.

What is worse, in the case of defenseless leakage, there are various methods to bypass or disable the installed security software, and even when the file contents are revealed, duplicated, printed, etc., there is no way for the user to check the file contents, and thus it is almost as if security has actually been released. Even when a file is deleted, it is not easy to recover from damage because the user comes to know that the file has been deleted only when the user needs the file.

In such a situation in the existing computer, the entire file system of the corresponding user may be accessed without any major restrictions, and thus security is significantly weakened. Therefore, even when the user is authenticated as an administrator of the host computer, the user might be a third party or a hacking program that is not a real user, and thus it would be of great significance when the user's access to the file system may be controlled by adding a security device and method to the existing file system.

DISCLOSURE

Technical Problem

The existing computer uses a file system managed and controlled by an operating system (OS) and provides security by granting different rights to each user. However, when a person who has obtained a right of an administrator accesses the computer without permission, the computer comes to be in a defenseless state. This is because all program codes of the OS, including program code for managing the file system, is implemented in a way that is actually executed by a central processing unit (CPU) of a host computer, and peripheral devices including a data storage device passively support the host computer. Therefore, it is impossible to avoid the above problems because the existing computer must be implemented in such a way that a security program is also executed in the CPU of the host computer.

Therefore, even when the user is authenticated as an administrator of the host computer, additional authentication is required for the user and only a file system configured variably according to an authentication operation is used. In the case in which it is necessary to manage the entire file system, security may be significantly enhanced when the data storage device uses a security function provided while partially managing the file system. Therefore, it is an object of the present invention to improve security vulnerabilities of the existing computer file system.

Technical Solution

In order to solve the above problems, the inventor have devised the concept of a dedicated sub-file system that is separated from a file system of an operating system (OS) and that is separately managed by a data storage device, and using the concept, proposes a data storage apparatus with a variable computer file system that is activated or deactivated according to whether authentication is passed.

Each dedicated sub-file system is activated or deactivated according to whether user authentication is passed. The dedicated sub-file system deactivated can neither be recognized by the host computer nor access it. Therefore, a third party trying to access the host computer cannot reach the dedicated sub-file system unless the dedicated sub-file system is activated, and thus security is significantly enhanced.

The dedicated sub-file system may be a file, a directory, or a partition or represented as a combination thereof. Further, the dedicated sub-file system may be represented as a combination of file system objects that satisfy properties provided by the file system and various other conditions.

By adopting the variable computer file system according to the present invention, the data storage apparatus, and also a network-attached storage (NAS), a file server and the like, that provides data to the host computer may perform an access information analysis operation, and may reject a request for accessing the objects belonging to the deactivated dedicated sub-file system or provide fake information so as to protect themselves. Further, they may periodically check whether the authentication is passed, and thereby provide the host computer with only configuration information on a file system, such as an active master file table (MFT) or both an active file allocation table (FAT), in which the file system objects belonging to the deactivated dedicated sub-file system are deleted, and the information of the file system objects included therein.

The OS of the existing computer distinguishes users, but basically has a structure in which an administrator can control the entire file system. Thus, it has intrinsic security vulnerabilities. The OS of the existing computer manages the data storage apparatus as a passive device and can access all storage spaces in the data storage apparatus freely. These storage spaces are generally managed as file systems of the host computer.

On the contrary, in the variable computer file system of the present invention, there are deactivated dedicated sub-file systems, which are storage spaces that are independently managed by the data storage apparatus and cannot be recognized and accessed by the host computer depending on conditions. The dedicated sub-file system can be activated only when authentication is passed, and can be recognized and accessed by the host computer. The variable computer file system of the present invention may have a plurality of dedicated sub-file systems, and in this case, each of the dedicated sub-file systems may specify a user thereof and set an authentication method thereof. In some cases, a plurality of users and a plurality of authentication methods may be provided. The dedicated sub-file system for which no user or authentication method is specified may be configured to be regarded as being released from security and access may be allowed without any restrictions.

The configuration of the dedicated sub-file system and management operations such as specification of users and authentication methods and the like are performed on a data storage apparatus in which the file system of the host computer is stored, a NAS, a file server, or the like. In the case of a PC, when the data storage apparatus in which the file system is stored is operated in the management mode independent of the OS, the user may configure the dedicated sub-file system and store information on the configuration in a separate space in the data storage apparatus. The dedicated sub-file system may include a file or directory, and a specific sector or cluster of a storage device.

Meanwhile, the data storage apparatus having the variable computer file system according to the present invention activates or deactivates the dedicated sub-file systems by checking whether authentication is passed. In this case, the remaining file system objects except for the deactivated file systems are provided to the host computer, as active file systems. Therefore, when the data storage apparatus according to the present invention receives from a host computer a request for providing information of the file system object, it analyzes the requested information, checks whether the request relates to the storage space of the activated dedicated sub-file system, and then responds to the request for providing the information of the host computer. On the other hand, when it is checked that the request relates to the storage space of the deactivated dedicated sub-file system, the data storage apparatus rejects the information provision or responds that the request is an unauthenticated request. In the case of Windows, since the information provision is rejected, a program for inspecting the data storage apparatus, such as "chkdsk", may be automatically executed in some cases, a method of disabling such a function by using a patch program or a method of providing fake information may also be considered. Through the above process, the file system objects belonging to the dedicated sub-file system can be hidden and protected.

As such, the data storage apparatus with the variable computer file system according to the present invention variably provides the host computer with pieces of information comprehensively showing the state of the file system objects such as an FAT and an MFT. The data storage apparatus according to the present invention manages by itself an FAT or an MFT for the entire file system, while it only provides to the host computer an active FAT or active MFT, which are configured except for the file system objects belonging to the deactivated dedicated sub-file system, and the information on the file system objects included therein. In this case, the storage space occupied by the file system objects of the dedicated sub-file system is prevented from being overwritten by the OS by applying a protection method such as marking a bad sector or a bad cluster.

As described above, by adopting the variable computer file system according to the present invention, the data storage apparatus, and also a network-attached storage (NAS), a file server and the like, that provide data to the host computer may perform an access information analysis operation and may reject a request for accessing objects belonging to the deactivated dedicated sub-file system or provide fake information so as to protect themselves; they may check whether the authentication is passed and may only provide to the host computer an active master file table (MFT) or an active file allocation table (FAT), in which the file system objects belonging to the deactivated dedicated sub-file system are deleted, and the information of the file system objects included therein. In this case, the dedicated sub-file system may be a file, a directory, or a partition or represented as a combination thereof. Further, the dedicated sub-file system may be represented as a combination of file system objects that satisfy properties provided by the file system and various other conditions.

For example, the dedicated sub-file system may be a single partition, a file, or a directory, such as "d:", "d:/WORLD", or "d:/WORLD/KOREA.doc", or may be represented as a combination thereof. Further, the dedicated sub-file system may be represented as a combination of all files in the drive d: with "ppt" as an extension, such as "d:/*.ppt". Furthermore, the dedicated sub-file system may be a combination of all files formed in a specific period such as a period from "FILE 1 JAN/2018 to 31 DEC/2018". Further, the dedicated sub-file system may also be a combination of all files including "my", such as "*my*.*". In addition, the dedicated sub-file system may represent various combinations of properties of files provided by the existing computer file system.

Meanwhile, the user authentication may be performed using an input/output device of the data storage apparatus, the NAS, or the file server. Alternatively, any device which is connected to one of these devices through wired/wireless communication may also be used as an authentication device. For example, it is possible to use a device carried by the user, for example, a mobile phone, a tablet computer, or the like, as the authentication device.

In this case, if a wireless communication network with limited communication distance such as Bluetooth or wireless Internet is used, when the user device (i.e., mobile phone, the tablet computer, or the like) is within the communication distance from the device employing the variable computer file system of the present invention, the user may be automatically authenticated, whereas when the user is out of the communication distance and so communication is disconnected or sensitivity is lowered, the authentication may be blocked automatically.

The data storage apparatus of the present invention, which has been realized and completed by the above principle, may include a host interface unit for communication with a host computer, a data storage unit configured to store data, a user interface unit configured to receive a user input and display or transmit information to be provided to the user, and a control unit which are connected to the host interface unit, the data storage unit, and the user interface unit and configured to control an operation mode of the data storage apparatus or to activate or deactivate the dedicated sub-file system according to whether the user authentication is passed, to provide, and manage, the dedicated sub-file system to the host computer as an active file system.

The data storage apparatus controlled by the control unit may operate in a normal mode and a management mode. The user may select the normal mode or the management mode using an input function of the user interface unit. In the management mode, the data storage apparatus receives setting information of the dedicated sub-file system from the user and stores the setting information in a database (DB) of the dedicated sub-file system, while in the normal mode the data storage apparatus checks the DB of the dedicated sub-file system, activates or deactivates the corresponding dedicated sub-file system according to whether the authentication is passed, and configures an active file system reflecting the activation or deactivation to respond to a request for accessing from the host computer. In this case, the user authentication is performed through an authentication method which is employed for each dedicated sub-file system.

The control unit may be implemented as a central processing unit (CPU) for controlling the data storage apparatus, and software and related hardware. The user interface unit may be implemented as a user operable electrical switch, a keyboard, a display device, and a combination of programs related thereto. Alternatively, the user interface unit may be implemented by a communication module and an external terminal to provide information to or receive information from the user in a wired or wireless manner. In this case, the user input/output device may be substantially replaced by an external terminal such as a mobile phone.

The control unit may include a first file system management module configured to perform, in the management mode, a management operation of receiving the setting information of the dedicated sub-file system from the user and storing or deleting the setting information.

Further, the control unit may include a second file system management module configured to provide the dedicated sub-file system that is activated only in the management mode to the host computer, to allow the user to execute, on the host computer, a management program included in the dedicated sub-file system, to receive the setting information of the dedicated sub-file system from the user, and to store and manage the setting information in the DB of the dedicated sub-file system.

In addition, the control unit may further include a file system configuration module and a file system protection module. It is preferable that the file system configuration module may be performed periodically and the file system protection module may be performed when receiving an access request from the host computer. The file system configuration module may receive and operate an interrupt signal related to a change in authentication environment from the user interface unit.

The file system configuration module may include an authentication analyzer configured to check whether authentication is passed for each dedicated sub-file system registered in the DB of the dedicated sub-file system, an authentication applier configured to form an active file system including dedicated sub-file systems for which authentication is checked, and a protection target recorder configured to generate a protection target map for protecting the dedicated sub-file systems for which authentication is not checked.

In this case, the authentication applier of the file system configuration module may include a first new object processor configured to, when a file system object belonging to the deactivated dedicated sub-file system is newly formed, automatically manage a corresponding object in a deactivated or activated form according to a rule set up by the user or determine a management method according to a user's command obtained through the user interface unit.

Further, the authentication applier of the file system configuration module may include a second new object processor configured to, when a file system object is newly formed, check whether an inactive file system object with the same name is present in a corresponding directory, and when it is confirmed that the inactive file system object with the same name is present, change the name of the inactive file system object and manage the inactive file system object.

The file system protection module may include an access information analyzer configured to analyze access information provided by the host computer, a protection target reviewer configured to review whether a storage space of an access address included in the access information exists in a protection target map, and a protection executer configured to selectively perform a protection operation, such as rejecting accessing the access address, providing fake information, etc., in the case of a protection target and to perform a specified operation according to a request for access by the host computer in the case of no protection target.

Meanwhile, when the data storage apparatus of the present invention supports a plurality of users, such as NAS, file systems are different from users, and thus the file system configuration module and the file system protection module are limitedly performed within the file system of the corresponding user.

In this case, the protection executer of the file system protection module may additionally have a function of notifying the user through the user interface unit that the protection operation has been executed or a function of leaving a log record related thereto, wherein the functions may be implemented in connection with an external terminal device such as a mobile phone of the user.

Advantageous Effects

The existing computer system is responsible for the security of the file system of an OS and security software, but there is a large limit to security in a situation where an administrator of the OS can control the entire system. That is, if a malicious third party becomes the administrator, the third party may use various methods, such as bypassing or disabling the installed security software using the OS control function, and thus files can be viewed, copied, printed, etc. and security is completely disabled. Therefore, even when the host computer has been accessed by a user as the administrator, the user might be a third party or a hacking program, not a real user, and thus the security of the file system can be significantly strengthened when access to the file system can be controlled by adding additional security devices and methods to the existing file system.

In the present invention, a variable computer file system having a dedicated sub-file system that is activated or deactivated according to whether authentication is passed is devised and applied to a data storage apparatus. Accordingly, since the dedicated sub-file system deactivated cannot be recognized by a host computer, a malicious third party or program cannot know which files are present in the computer of the user, thereby significantly enhancing security. Also in the present invention, such a function is implemented in a data storage apparatus storing file system information of the OS, or in a network-attached storage (NAS) or a server controlling the data storage apparatus, rather than the host computer in which the OS is running, so as to separate the function from the OS of the host computer. Therefore, security of the existing computer system can be enhanced stably.

Resultantly, since the variable computer file system devised according to the present invention is implemented in the data storage apparatus storing the file system information of the OS, or in the NAS or a server controlling the data storage apparatus, rather than the host computer in which the OS is running, security function independent of the OS of the host computer can be obtained and thus it is possible to protect the file system of the computer reliably and effectively.

MODES OF THE INVENTION

Figure 1:
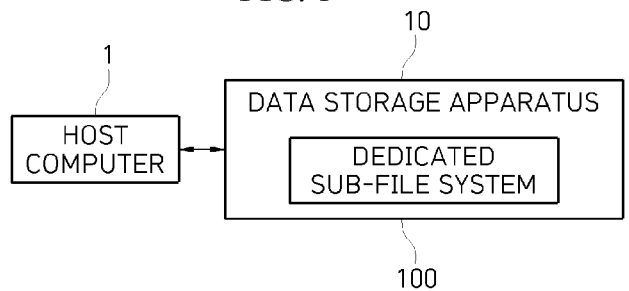
FIG. 1 is a conceptual diagram of the present invention.

Advantages and features of the present invention and methods of achieving the same will be clearly understood with reference to the accompanying drawings and the following detailed embodiments. However, the present invention is not limited to the embodiments to be disclosed below and may be implemented in various different forms. The following embodiments are merely provided to completely inform those skilled in the art of the scope of the present invention. The scope of the present invention is defined by the appended claims.

Meanwhile, the terms used herein are provided only to describe the embodiments of the present invention and not for purposes of limitation. In this specification, the singular forms include the plural forms unless the context clearly indicates otherwise. It will be understood that the terms "comprise" and/or "comprising," when used herein, specify some stated components, steps, operations, and/or elements but do not preclude the presence or addition of one or more other components, steps, operations, and/or elements.

Hereinafter, exemplary embodiments of the present invention will be described in detail with reference to the accompanying drawings. In this specification, when reference numerals are assigned to components of each drawing, it should be noted that, when the same components are illustrated in different drawings, the same numerals are assigned to the same components whenever possible. In addition, in the description of the present invention, when it is determined that detailed descriptions of related well-known configurations or functions unnecessarily obscure the gist of the present invention, the detailed descriptions thereof will be omitted.

FIG. 1 is a conceptual diagram of the present invention and shows the concept of a data storage apparatus 10 employing a dedicated sub-file system 100 which is activated or deactivated according to whether authentication is passed, that is, a variable computer file system. Here, when the dedicated sub-file system 100 in the data storage apparatus 10 is deactivated, the dedicated sub-file system 100 cannot be recognized by a host computer 1. Such a function may be embodied in a data storage apparatus that stores file system information of an operating system (OS), or in a network-attached storage (NAS) or a file server that controls the data storage apparatus, rather than a host computer in which the OS is running, such that the function is separated from the OS of the host computer.

The present invention is quite different from the case of a general computer in which an entire file system is managed by allocating different storage areas to each user account. In a general computer, an administrator may see the entire file system at any time and the file system is always under the control of the OS, however in the variable computer file system of the present invention, the comprehensive control, that a file system of the existing computer had, is restricted, and some controls are transferred to the data storage apparatus (or another entity that manages the data storage apparatus) and an authentication function is added. Thus, security is significantly enhanced. That is to say, in the present invention, a function that the OS of the computer cannot control is newly devised, where the function is designed to be performed on another hardware rather than hardware on which the OS of the computer is running.

Reviewing the conventional arts, a function of hiding a part of a file system is a method that has been used in computers for a long time, and some commercially available computers uses, instead of using a password, a method in which a mobile phone of a user is registered and then the use of the computer is allowed to be disabled by making an attached hard disk drive (HDD) not be recognized when the mobile phone is not nearby (i.e., not authenticated).

However, since the function of hiding files is a simple method of setting properties of files or directories to be hidden and is performed under the control of the OS, an administrator of the corresponding computer may change the property at any time to expose a corresponding file system object. Further, the case in which a mobile phone or another authentication device is used to authenticate the use of a computer or a data storage apparatus is a simple technique for determining only whether the corresponding computer or data storage apparatus can be used, and thus the entire file system enters under the control of the OS when log-in is completed. However, in the present invention, the file system is protected by independently managing the file system of the OS by the data storage apparatus and providing the dedicated sub-file system 100 that is activated, or deactivated and hidden, according to whether authentication is passed, thereby being differentiated in configuration and effect from the conventional art.

For this reason, in the present invention, the concept of the dedicated sub-file system is introduced. Each dedicated sub-file system 100 is activated or deactivated according to whether authentication is passed, and is recognized by the host computer 1. The deactivated dedicated sub-file system 100 cannot be recognized and accessed by the host computer 1. Therefore, a third party accessing the host computer 1 cannot access the dedicated sub-file system 100 unless there is a means for activating the dedicated sub-file system 100, and thus security is significantly enhanced.

Here, the dedicated sub-file system 100 is a file, a directory, or a partition itself or is represented as a combination thereof. Further, the dedicated sub-file system 100 may be represented as a combination of file system objects that satisfy properties provided by the file system and satisfied various other conditions.

Meanwhile, the OS of the existing computer distinguishes users but basically has a structure in which an administrator may control the entire file system, and thus there are several security vulnerabilities. In addition, the OS of the existing computer may manage the data storage apparatus as a passive device and may access all storage spaces in the data storage apparatus freely. It is common the storage spaces are managed as file systems of the host computer.

In contrast, in the data storage apparatus 10 with the variable computer file system of the present invention, there are deactivated dedicated sub-file systems 100, which are storage spaces that cannot be recognized and accessed by the host computer 1 depending on conditions. The dedicated sub-file system 100 may be activated only when authentication is passed and may be recognized and accessed by the host computer 1. The variable computer file system of the present invention may have a plurality of dedicated sub-file systems 100, and in this case, each of the dedicated sub-file systems 100 may specify a user thereof and set an authentication method thereof. In some cases, a plurality of users and a plurality of authentication methods may be provided. The dedicated sub-file system 100 for which no user or authentication method is specified may be configured to be regarded as being released from security and access may be allowed without any restrictions.

The configuration of the dedicated sub-file system 100 and management operations such as specification of users and authentication methods and the like are performed on a data storage apparatus in which the file system of the host computer 1 is stored, a NAS, a file server, or the like. In the case of PC, when the data storage apparatus in which the file system is stored is operated in a management mode independent of the OS, the user configures the dedicated sub-file system 100 and stores information on the configuration in a separate space in the data storage apparatus 10.

Meanwhile, the data storage apparatus 10 with the variable computer file system according to the present invention activates or deactivates the dedicated sub-file systems 100 by checking whether authentication is passed. In this case, the remaining file system objects except for the deactivated file systems are configured as active file systems and provided to the host computer 1.

Therefore, when the data storage apparatus 10 receives a request for providing information of the file system object from the host computer 1, analyzes the requested information, checks whether the request relates to the storage space of the activated dedicated sub-file system 100, and then responds to the request for providing the information of the host computer 1. On the other hand, when it is checked that the request relates to the storage space of the deactivated dedicated sub-file system 100, the data storage apparatus 10 rejects the information provision or responds that the request is an unauthenticated request. In the case of Windows, when information provision is rejected, an inspection program of the data storage apparatus, such as "chkdsk", may be automatically executed in some cases, and thus a method of disabling such a function with a patch program or a method of providing fake information may also be considered. Through the above process, the file system objects belonging to the dedicated sub-file system 100 are hidden and protected.

Therefore, the data storage apparatus 10 with the variable computer file system according to the present invention variably provides pieces of information comprehensively showing the state of the file system objects, such as a file allocation table (FAT) and a master file table (MFT), to the host computer 1. The data storage apparatus 10 according to the present invention manages an FAT or an MFT for the entire file system by itself and provides only an active FAT or active MFT, which are configured except for the file system objects belonging to the deactivated dedicated sub-file system 100 and information on the file system objects included therein to the host computer 1. In this case, the storage space used by the file system objects of the dedicated sub-file system 100 is prevented from being overwritten by the OS by applying a protection method such as marking as a bad sector or a bad cluster.

As described above, by adopting the variable computer file system according to the present invention, the data storage apparatus, the NAS, the file server, and the like that provide the data to the host computer 1 are protected by performing an access information analysis operation to reject a request for accessing objects belonging to the deactivated dedicated sub-file system 100 or provide fake information, and by checking whether the authentication is passed, only the active MFT or active FAT in which the file system objects belonging to the deactivated dedicated sub-file system 100 are deleted and the information of the file system objects included therein are provided to the host computer 1.

Here, the dedicated sub-file system 100 is a file, a directory, or a partition itself or is represented as a combination thereof. Further, the dedicated sub-file system 100 may be represented as a combination of file system objects that satisfy properties provided by the file system and various other conditions.

For example, the dedicated sub-file system 100 may be a single partition, a file, or a directory, such as "d:", "d:/WORLD", or "d:/WORLD/KOREA.doc", or may be represented as a combination thereof. Further, the dedicated sub-file system 100 may be represented as a combination of all files in the d: drive with ppt as an extension such as "d:*.ppt". Furthermore, the dedicated sub-file system 100 may be a set of all files formed in a specific period such as a period from FILE 1, Jan. 2018 to 31, Dec. 2018. Further, the dedicated sub-file system 100 may also be a set of all files including "my" such as "*my*.*". In addition, the dedicated sub-file system 100 may represent various combinations of properties of files provided by the existing computer file system.

Meanwhile, the user authentication may be performed using an input/output device of the data storage apparatus, the NAS, or the file server. Further, any device which is connected to one of these devices through wired/wireless communication may also be used as an authentication device. For example, it is possible to use a device carried by the user, for example, a device such as a mobile phone, a tablet computer, or the like, as the authentication device. In this case, by using a wireless communication network with limited transmission and reception distance, such as Bluetooth or wireless Internet, when the user possesses the mobile phone, the tablet computer, or the like and is within a certain distance from the device with the variable computer file system of the present invention so that communication is possible, the user is automatically authenticated, and when the user is out of a certain distance and communication is disconnected or communication sensitivity is lowered below a set level, the authentication is blocked automatically.

Figure 2:
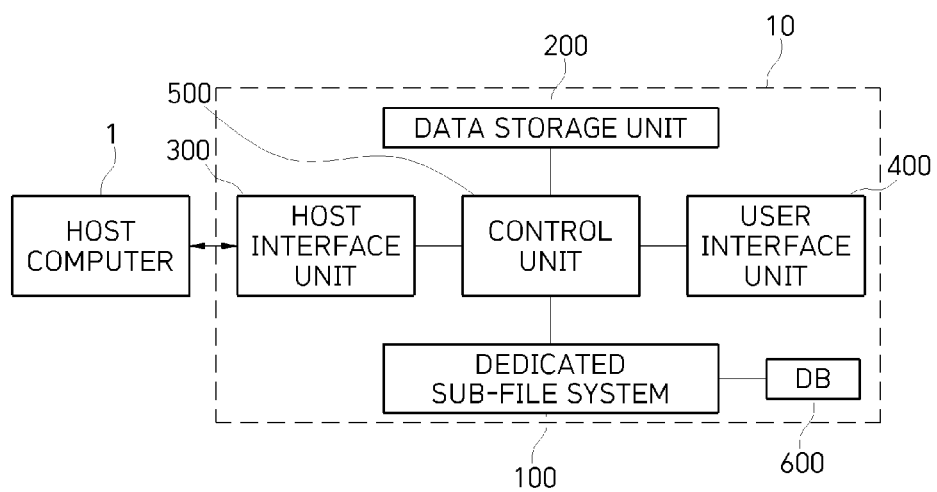
FIG. 2 is a configuration diagram of a data storage apparatus (10) embodying the concept of the present invention.
Figure 3:
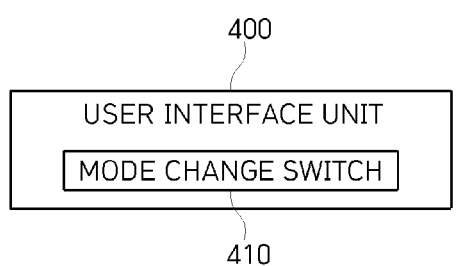
FIG. 3 is a configuration diagram of a user interface unit.

FIG. 2 illustrates a configuration of the data storage apparatus 10 in which the above-described concept is specifically embodied.

The data storage apparatus 10 of the present invention includes a host interface unit 300 for communication with the host computer 1, a data storage unit 200 configured to store data, a user interface unit 400 configured to receive a user input or display or transmit information to be provided to the user, and a control unit 500 which are connected to the host interface unit 300, the data storage unit 200, and the user interface unit 400 and configured to control an operation mode of the data storage apparatus 10 or configured to activate or deactivate the dedicated sub-file system 100 according to whether user authentication is passed to provide and manage the dedicated sub-file system 100 to the host computer 1 as an active file system.

The operation mode of the data storage apparatus 10 controlled by the control unit 500 includes a normal mode and a management mode. The user may select the normal mode or the management mode using an input function of the user interface unit 400. In the management mode, the data storage apparatus 10 receives setting information of the dedicated sub-file system 100 from the user and stores the setting information in a database (DB) 600 of, or connected to, the dedicated sub-file system 100, while in the normal mode, the data storage apparatus 10 checks the DB 600, activates or deactivates the corresponding dedicated sub-file system 100 according to whether the authentication is passed, and configures an active file system reflecting the activation or deactivation to respond to a request for accessing the host computer 1. In this case, the user authentication is performed through a user and an authentication method which are registered for each dedicated sub-file system 100.

The control unit 500 may be implemented as software, and related hardware, in a central processing unit (CPU) for controlling the data storage apparatus 10 and the user interface unit 400 may be implemented as an electrical switch, a keyboard, and a display device, which are operated by the user, or as programs related thereto. Alternatively, the user interface unit 400 may be implemented in a manner of being composed of a communication module and an external terminal and providing information to the user or receiving information on the basis of information transmitted in a wired or wireless manner. In this case, the user input/output device may be substantially replaced by an input/output device of an external terminal such as a mobile phone.

The control unit 500 includes a first file system management module 530 configured to perform a management operation of receiving the setting information of the dedicated sub-file system 100 from the user and storing or deleting the setting information, in the management mode.

Further, the control unit 500 includes a second file system management module 540 configured to allow the user to execute a management program included in a management mode dedicated sub-file system 100 on the host computer by providing the management mode dedicated sub-file system 100 that is activated only in the management mode to the host computer 1, receive the setting information of the dedicated sub-file system 100 from the user, and store and manage the setting information in the DB 600 of the dedicated sub-file system.

Figure 4:
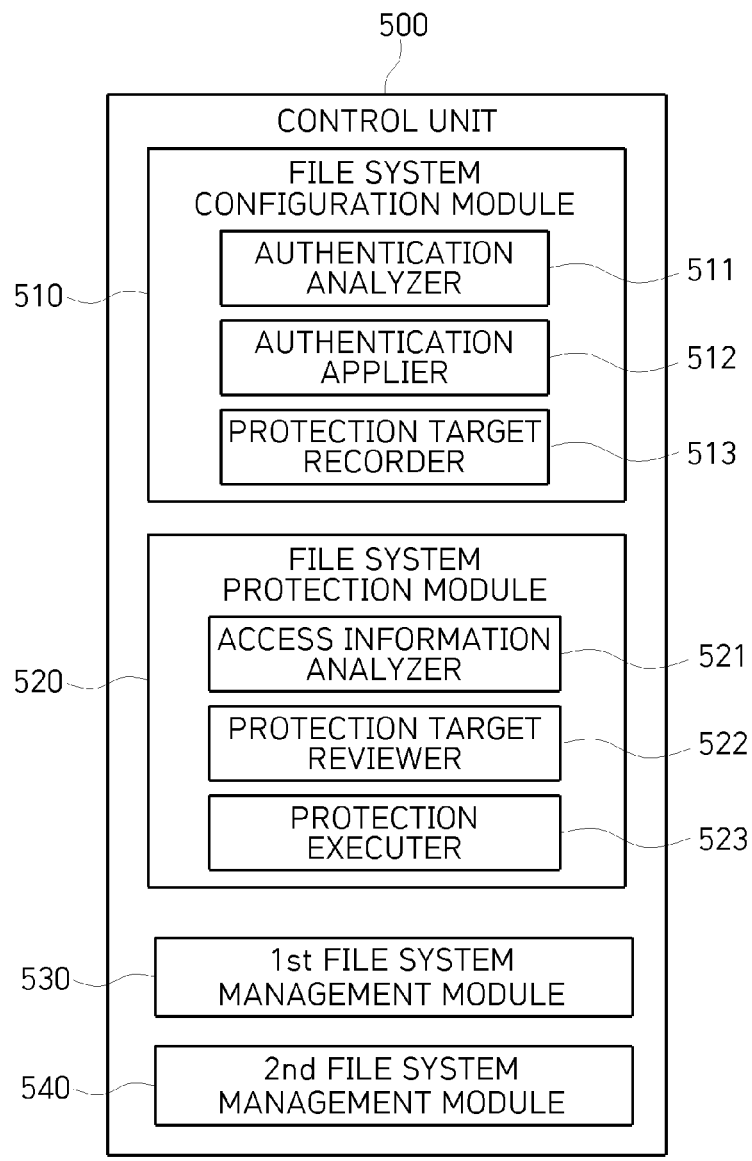
FIG. 4 is a configuration diagram of a control unit.

FIG. 4 illustrates a configuration of the control unit 500.

The control unit 500 includes a file system configuration module 510 and a file system protection module 520. The file system configuration module 510 may be performed periodically and the file system protection module 520 is performed when receiving an access request from the host computer 1. The file system configuration module 510 receives and executes an interrupt signal related to a change in authentication environment from the user interface unit 400.

The file system configuration module 510 may include an authentication analyzer 511 configured to check whether authentication is passed for each dedicated sub-file system 100 registered in the DB 600 of, or connected to, the dedicated sub-file system 100, an authentication applier 512 configured to form an active file system including dedicated sub-file systems 100 for which authentication is checked, and a protection target recorder 513 configured to generate and store a protection target map for protecting dedicated sub-file systems 100 for which authentication is not checked.

Figures 5, 6:
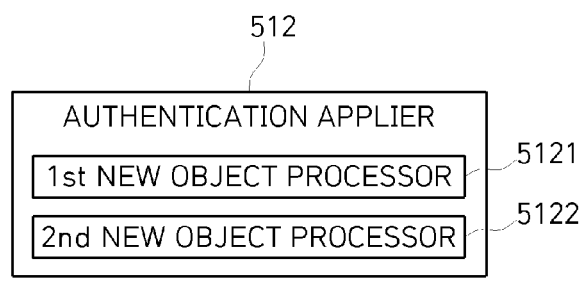
FIG. 5 is a configuration diagram of an authentication applier.
FIG. 6 is an exemplary configuration diagram of a dedicated sub-file system.

Here, referring to FIG. 5, the authentication applier 512 may include a first new object processor 5121, which is configured to, when a file system object belonging to the deactivated dedicated sub-file system 100 is newly formed, automatically manage a corresponding object in a deactivated or activated form according to a rule set by the user or determine a management method according to a user's command obtained through the user interface unit. Further, the authentication applier 512 may further include a second new object processor 5122, which is configured to, when a file system object is newly formed, check whether an inactive file system object with the same name is present in a corresponding directory, and when it is confirmed that the inactive file system object with the same name is present, change a name of the inactive file system object, and manage the inactive file system object.

Meanwhile, the file system protection module 520 may include an access information analyzer 521 configured to analyze access information provided by the host computer 1, a protection target reviewer 522 configured to review whether a storage space of an access address included in the access information exists in a protection target map, and a protection executer 523 configured to selectively perform a protection operation, such as rejecting accessing the access address, providing the fake information, etc., in the case of a protection target, and, on the other hand, to perform a specified operation according to a request for access by the host computer 1 in the case of no protection target.

Meanwhile, when the data storage apparatus 10 of the present invention supports a plurality of users, such as a NAS and the like, the file system is different for each user, and thus the file system configuration module 510 and the file system protection module 520 are limitedly performed within the file system of the corresponding user. In this case, the protection executer 523 of the file system protection module 520 may additionally have a function of notifying the user through the user interface unit 400 that the protection operation has been executed or of leaving a log record related thereto, wherein the function may be implemented in connection with an external terminal device such as a mobile phone of the user.

Hereinafter, an exemplary operation of the dedicated sub-file system 100 will be described.

FIG. 6 shows an exemplary configuration of the DB 600 of the dedicated sub-file system. In DB construction in FIG. 6, it is assumed that two USERs U_AA and U_BB use a PC. First, the user U_AA specifies a directory D:/AA, all files with ppt extension, and all files and directories with the word "my" in the file name, in his/her file system, as a dedicated sub-file system SFS (in FIG. 6, "SUB_FILE_SYSTEM"). Therefore, when the user U_AA logs in, the data storage apparatus 10 should provide the three dedicated sub-file systems of the user U_AA to the host computer 1. However, these three dedicated sub-file systems have to be provided to the host computer 1 only when user-specified authentication conditions (in FIG. 6, "CERTIFICATION") are satisfied. In the case of authentication with a password PASSWORD_AA as one authentication condition, an active file system including the dedicated sub-file system "SFS D:/AA" is provided to the host computer 1. This password may be input through the user interface unit 400 of the data storage apparatus 10 or through a mobile device connected thereto. As another authentication condition, the presence or absence of the mobile device of the user, such as a mobile phone or a tablet computer, may be used. In the FIG. 6 example, when a mobile device MOBILE_AA of the user is connected to the data storage apparatus 10 through wired/wireless communication and passes a predetermined authentication procedure, a dedicated sub-file system "SFS FILE *.ppt", to which the files with the ppt extension belong, is authenticated and then included in the active file system. Meanwhile, the dedicated sub-file system "SFS *my*.*", in which the files and directories having the word "my" are specified, may be authenticated by one of two mobile devices MOBILE_AA and MOBILE_CC of the user and then activated.

Next, three dedicated sub-file systems specified by the user U_BB will be described. As in FIG. 6, the user U_BB specified files or directories belonging to D:/BB, files generated between 1, Mar. 2019 and 3, Mar. 2019 among files, and files or directories belonging to C:/PROGRAM FILES/TREE, in his/her entire file system, as a dedicated sub-file system SFS. When authentication with a hardware key device (USBKEY_BB) connected to a Universal Serial Bus (USB) port is completed, the dedicated sub-file system, to which D:/BB belongs, is activated and then it is included in the active file system. In this case, both of the user U_AA and U_BB use a drive D: and the drive D: used by the user U_AA and the drive D: used by the user U_BB are logically completely separated spaces. That is, the drive D: used by the user U_AA and the drive D: used by the user U_BB are recognized as the drive D: in the host computer 1 regardless of the physical implementation format. As the remaining cases, in the cases of authentication with a mobile device MOBILE BB, which is a mobile device of the user U_BB, the dedicated sub-file system is activated, and the use of an application program stored in C:/PROGRAM FILES/TREE is restricted when the dedicated sub-file system is deactivated.

Here, the CERTIFICATION conditions MOBILE AA and MOBILE BB means that authentication is performed in accordance with whether a mobile phone, a tablet computer, or another simple mobile device (e.g., a device implemented as a system chip in which a wired/wireless communication device, a CPU, and the like are integrated as one) of the user are present or not. When these devices are connected to the data storage apparatus 10 through the user interface unit 400, these devices transmit their unique ID to the data storage apparatus 10 to notify it of the user's access or to execute an application program such as an app. on the corresponding mobile device to transmit or receive information to or from the user. In this case, the mobile devices and the hardware key may provide a series of information for encryption or decryption in addition to the unique ID so that the pieces of information stored in the data storage apparatus may be encrypted or decrypted.

Meanwhile, the file system configuration module 510 of the data storage apparatus 10 of the present invention checks the connection state of the authentication device frequently or when there is a change in authentication environment. The connection state of the authentication device may be checked whenever the host computer 1 is accessed or may be checked by receiving an interrupt signal from the user interface unit 400 when there is a change in authentication environment. However, in this case, performance may be degraded, and thus it is necessary to periodically check the authentication device. For example, it is assumed that the authentication device is checked every five minutes. When the authentication device is checked, the data storage apparatus 10 generates an active file system including a dedicated sub-file system activated by the corresponding authentication device. Specifically, in the case of an OS such as Linux, in an FAT of the file system, or in the case of Windows, in an MFT, an active FAT or an active MFT is generated by excluding the deactivated dedicated sub-file systems. Further, in order to protect the contents of the deactivated dedicated sub-file systems, the space that the deactivated dedicated sub-file systems are using should be marked for use. An OS such as Windows performs a protection operation by marking the space used by the deactivated dedicated sub-file systems as a bad sector or used sector in a storage space state map used to determine whether the storage space is usable or not. When only the same authentication device as the authentication device checked five minutes ago is recognized, an active file system may be configured by reflecting a processing method for newly generated file system objects.

Therefore, although the active file system may actually be a subset of the entire file system, the OS or application programs of the host computer 1 regard the provided active file system as the entire file system and are operated. Therefore, the host computer 1 cannot know the existence of the file or directory belonging to the dedicated sub-file system 100 unless the dedicated sub-file systems 100 are activated by the user's authentication.

Meanwhile, the user may generate an object belonging to a specific dedicated sub-file system 100 in a situation where the corresponding dedicated sub-file system 100 is deactivated. For example, in the above example, a PowerPoint file may be generated in a situation where the dedicated sub-file system [SFS *.ppt] is deactivated. In this case, the corresponding object is not completely generated, but may be in the middle of being generated, and thus the object may be managed by receiving an instruction on how to handle the object from the user.

Therefore, it is possible to manage these situations by displaying these situations on the user interface unit 400 or reporting the situations to the user through a mobile device such as a mobile phone connected thereto. For example, when the file system configuration module 510 detects that the ppt file is generated in a situation where the dedicated sub-file system "SFS *.ppt" is deactivated, the user is notified of the fact that the dedicated sub-file system "SFS *.ppt" is deactivated, and then the dedicated sub-file system "SFS *.ppt" is activated by receiving a command from the user, the newly generated ppt file is excluded from a protection target until the next login, or the dedicated sub-file system "SFS *.ppt" is deactivated by applying the protection right away. Alternatively, such information may be received as preset information and automatically processed according to the settings.

Next, it is also possible to manage a case where a file or directory is generated with the same name as the file system object belonging to the deactivated dedicated sub-file system 100. The OS manages not to generate a file or directory with the same name in the same directory. For example, when a file called project.ppt already exists, the OS will ask if the user wants to overwrite the file. However, in the data storage apparatus with the variable computer file system of the present invention, since the OS cannot recognize the deactivated and hidden files, the OS generates a file with the same name as project.ppt but with different contents without any problem when the dedicated sub-file system "SFS *.ppt" is deactivated. In this case, the data storage apparatus with the variable computer file system of the present invention may respond by automatically changing the name of the existing project.ppt file, which is automatically deactivated, to another name uniquely identifiable within the corresponding directory, such as project_old0.ppt. Alternatively, the name of the corresponding file generated by the host computer 1 may be changed, but there is a disadvantage in that the name of the file that is hidden and protected is exposed when the name of the corresponding file is changed.

Meanwhile, as described in the above example, when a plurality of users uses a computer, a method of matching a user logged into the host computer 1 and a user recognized by the data storage apparatus 10 is necessarily required. Therefore, it is necessary to have an additional device so that the host computer 1 itself recognizes the mobile device or password together, but an additional cost is incurred.

However, since the data storage apparatus 10 and the host computer 1 are already connected, the data storage apparatus 10 may transmit the user recognized by the data storage apparatus 10 to the host computer 1 so that it is possible to process the user as being logged in. That is, the host computer 1 inquires whether there is an authenticated user of the file system of the data storage apparatus 10 in the log-in process, and when there is an authenticated user, the log-in process may be replaced by a method in which the data storage apparatus 10 reads the user's ID and/or password from the user interface unit 400 or the hardware key device or the mobile device connected to the user interface unit 400 and transmits the user's ID and/or password to the host computer 1.

Next, it is assumed that there are several mobile authentication devices at the same time. When only one user can log in to the computer at the same time, there may be confusion when the mobile devices MOBILE AA and MOBILE BB are recognized at the same time after logging in as in the above example. However, the confusion is simply solved by recognizing only the mobile device of the user who has logged in for the first time. For example, when the user U_AA logs in, only the mobile devices MOBILE AA and MOBILE_CC are recognized and can be authenticated, and even when the mobile device MOBILE BB is recognized, the mobile device MOBILE BB cannot be authenticated. Therefore, the user U_AA should log out before the user U_BB may log in.

However, when two or more user authentication devices are recognized in the log-in process, it is necessary to organize the user authentication devices. In this case, the data storage apparatus 10 transmits a message to all the recognized mobile devices to notify the existence of the plurality of users, and regards the mobile device that responds first as the mobile device of the logged-in user, thereby solving this problem. Alternatively, the problem may be solved by prioritizing the users. That is, when the user U_AA has a high priority among the users U_AA and U_BB, the problem may be solved in such a way that user U_BB is recognized only when the user U_AA gives up logging in.

Meanwhile, in a device such as a NAS or a file server, multiple users may use the data storage apparatus 10 of the present invention at the same time. In this case, since the DB 600 of the dedicated sub-file system is different for each user, the data storage apparatus 10 specifies the storage space on the basis of the provided user information, and then the data storage apparatus 10 provides the active file system which is different for each user to the host computer 1 of the users when executing the file system configuration module 510 and the file system protection module 520.

The configuration of the present invention has been described in detail with reference to the exemplary embodiments of the present invention. The above description of the present invention is only exemplary, and it will be understood by those skilled in the art that various modifications can be made without departing from the scope of the present invention and without changing essential features. Therefore, the above-described embodiments should be considered in a descriptive sense only and not for purposes of limitation. The scope of the present invention is defined not by the detailed description but by the appended claims, and encompasses all modifications or alterations derived from meanings, the scope and equivalents of the appended claims.

The invention claimed is:

1. A data storage apparatus with a variable computer file system,
    which is a data storage apparatus connected to a host computer, the data storage apparatus comprising:
    one or more dedicated sub-file systems that are separated from an operating system (OS) of the host computer, include a database (DB) for storing configuration information, and are activated or deactivated according to a result of determining whether a user is authenticated;
    a host interface unit configured to communicate with the host computer;
    a data storage unit configured to store data;
    a user interface unit configured to receive a user input and transmit information to be provided to the user; and
    a control unit connected to the host interface unit, the data storage unit, and the user interface unit, and configured to control an operation mode of the data storage apparatus and activate or deactivate the dedicated sub-file system according to whether the user is authenticated, wherein the operation mode of the data storage apparatus controlled by the control unit includes a normal mode and a management mode which are selected by the user using the user interface unit, wherein, in the management mode, the data storage apparatus receives setting information on the dedicated sub-file system from the user and stores the setting information in the DB of the dedicated sub-file system, and in the normal mode, the data storage apparatus checks the DB of the dedicated sub-file system, activates or deactivates a corresponding dedicated sub-file system according to whether authentication is passed, and configures an active file system reflecting the activation or deactivation to respond to a request for accessing the host computer.

2. The data storage apparatus of claim 1, wherein, when the authentication is passed, an active file system is configured only using remaining file system objects except for file system objects belonging to the deactivated dedicated sub-file systems and is provided to the host computer.

3. The data storage apparatus of claim 1, wherein the dedicated sub-file system is represented in a manner of including at least one of a file, a directory, a set of files or directories, which are defined by a phrase indicating the files or directories, and a partition.

4. The data storage apparatus of claim 1, wherein, when the data storage apparatus receives a request for providing information on a file system object from the host computer, the data storage apparatus analyzes the requested information, determines whether the request relates to a storage space of the activated dedicated sub-file system, and then responds to the request for providing the information of the host computer, and when it is determined that the request relates to the storage space of the deactivated dedicated sub-file system, the data storage apparatus either rejects providing the information or responds that the request is an unauthorized request.

5. The data storage apparatus of claim 1, wherein the data storage apparatus manages configuration information on an entire file system by itself and provides only configuration information on a partial file system configured except for file system objects belonging to the deactivated dedicated sub-file system and information on file system objects included therein to the host computer.

6. The data storage apparatus of claim 1, wherein the user authentication is performed by at least one of the data storage apparatus, an input/output device of a network-attached storage (NAS) or a file server, and a device connected thereto through wired/wireless communication.

7. The data storage apparatus of claim 1, wherein the user interface unit is implemented by an electrical switch, a keyboard, and a display device, which are operated by the user, and a combination of programs related thereto.

8. The data storage apparatus of claim 1, wherein the user interface unit is implemented in a manner of being composed of a communication module and an external terminal and providing information to the user or receiving information on the basis of information transmitted in a wired or wireless manner.

9. The data storage apparatus of claim 1, wherein the control unit includes a first file system management module configured to perform a management operation of receiving the setting information of the dedicated sub-file system from the user and storing or deleting the setting information in the management mode.

10. The data storage apparatus of claim 1, wherein the control unit further includes a second file system management module configured to allow the user to execute a management program included in a management mode dedicated sub-file system on the host computer by providing the management mode dedicated sub-file system that is activated only in the management mode to the host computer, receive the setting information of the dedicated sub-file system from the user, and store and manage the setting information in the DB of the dedicated sub-file system.

11. The data storage apparatus of claim 1, wherein the control unit includes a file system configuration module configured to form a file system and a file system protection module configured to protect the file system, wherein the file system configuration module includes an authentication analyzer configured to check whether authentication is passed for each dedicated sub-file system registered in the DB of the dedicated sub-file system, an authentication applier configured to form an active file system including dedicated sub-file systems for which authentication is checked, and a protection target recorder configured to generate and store a protection target map for protecting dedicated sub-file systems for which authentication is not checked, and the file system protection module includes an access information analyzer configured to analyze access information provided by the host computer, a protection target reviewer configured to review whether a storage space of an access address included in the access information exists in a protection target map, and a protection executer configured to selectively perform a protection operation in a case of a protection target and to perform a specified operation according to a request for access by the host computer in a case of no protection target.

12. The data storage apparatus of claim 11, wherein the authentication applier of the file system configuration module includes a first new object processor configured to, when a file system object belonging to the deactivated dedicated sub-file system is newly formed, automatically manage a corresponding object in a deactivated or activated form according to a rule set by the user and determine a management method according to a user's command obtained through the user interface unit.

13. The data storage apparatus of claim 11, wherein the authentication applier of the file system configuration module includes a second new object processor configured to, when a file system object belonging to the deactivated dedicated sub-file system is newly formed, check whether an inactive file system object with the same name is present in a corresponding directory, and when it is confirmed that the inactive file system object with the same name is present, change a name of the inactive file system object and manage the inactive file system object.

* * * * *